United States Patent
Reinhards

[11] 3,890,669
[45] June 24, 1975

[54] LOCKABLE CASTOR, IN PARTICULAR SWIVEL CASTOR

[75] Inventor: Günter Reinhards, Wermelskirchen, Rhineland, Germany

[73] Assignee: Firm Tente-Rollen Gesellschaft mit beschrankter Haftung Companie, Wermelskirchen-Tente, Rhineland, Germany

[22] Filed: Jan. 8, 1974

[21] Appl. No.: 431,659

[30] Foreign Application Priority Data
Mar. 3, 1973 Germany............................ 2310775

[52] U.S. Cl........................................ 16/35; 188/1
[51] Int. Cl........................................ B60b 33/00
[58] Field of Search ............... 16/35, 35 D; 188/1 D

[56] References Cited
UNITED STATES PATENTS
3,751,757  8/1973  Stosberg et al. ........................ 16/35
3,772,733  11/1973  Strosberg et al. ...................... 16/35

FOREIGN PATENTS OR APPLICATIONS
1,563,725  3/1969  France................................ 16/35 D

*Primary Examiner*—Paul R. Gilliam
*Assistant Examiner*—Doris L. Troutman
*Attorney, Agent, or Firm*—Burgess, Dinklage & Sprung

[57] ABSTRACT

A castor, in particular of the kind of a swivel castor, comprises a wheel which is supported in a wheel clevis and locking means for locking the rotation of the wheel and/or the swivel motion of the wheel clevis in the case of a swivel castor. The locking means including a clamping lever that is pivotably supported in the clevis cavity and may be pivotable and lockable in its locking position by operation of a push-button control element. The push-button control element and a movable locking element are disposed on the clamping lever. The movable locking element can be locked in its locking position by said push-button control element. The clamping lever may be a two-armed rocker which is supported on a transverse shaft. The movable locking element may be a double-sided pivoting lever which is supported on the clamping lever by means of a pivoting shaft. In an embodiment the movable locking element may be a pivotable bell crank which is provided with an upwardly orientated locking arm.

8 Claims, 20 Drawing Figures

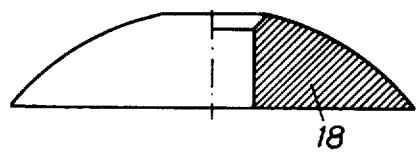
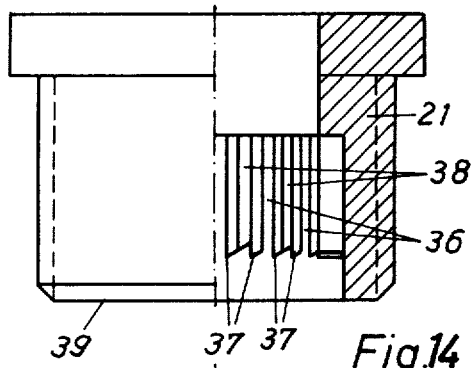
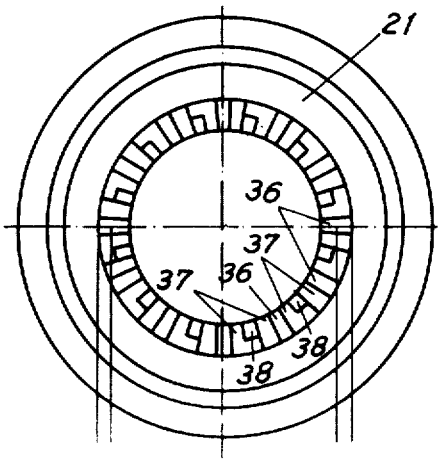
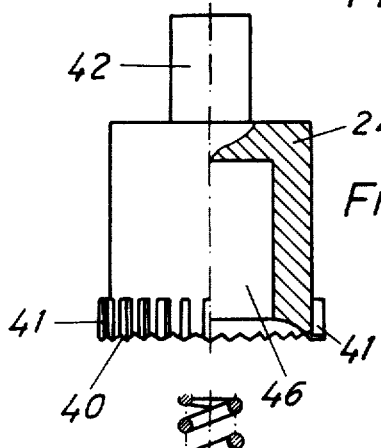
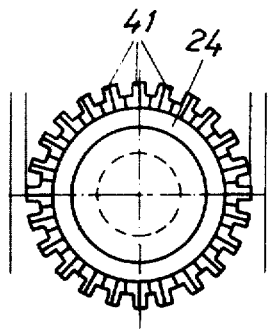
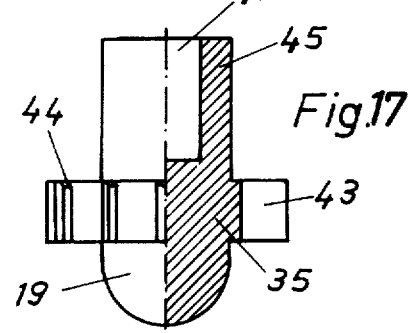
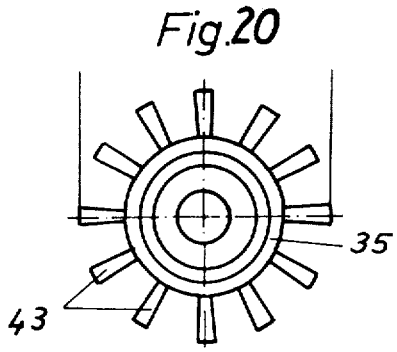

LOCKABLE CASTOR, IN PARTICULAR SWIVEL CASTOR

The invention relates to a castor with a locking device for locking the wheel. In the case of a non-swivelling wheel, the locking device is provided to lock the rotation of the wheel. In the case of a swivel castor with a pivotable wheel, the locking device may be provided for locking the swivel motion of the wheel. The locking device for a swivel castor may however also be used for locking the rotation as well as the swivel motion of the wheel.

The locking device of such castors and more particularly of swivel castors usually contains a locking element which is supported in the clevis cavity and is pressed in suitable manner against the wheel tyre to lock the rotation of the wheel and/or is brought into engagement with a tooth system of a fixed ball bearing shell of the castor holder to lock the swivel motion of the wheel. The locking element, which may for example comprise a strong leaf spring or a clamping lever, for example in the form of a one-sided or double-sided pivoting lever in known embodiments may be brought into the locked position and then again into the loose position as desired by means of a foot control lever which is provided on the castor. This may be achieved by operating the foot control lever with the toe by treading the foot control lever downwardly to lock the castor and by raising it again with the toe for unlocking it. Raising the foot control lever with the toe however is awkward and more particularly in the case of hospital furniture which is provided with such lockable castors, leads to damage of the light-weight foot wear of hospital personnel, more particularly female hospital personnel.

Castors have therefore already been proposed with a locking device in which locking as well as subsequent unlocking of the castor is achieved by successive downward treading of the foot control lever. To this end, the locking device was provided with a ratchet wheel which is rotated by one indexing tooth with each treading down of the foot control lever and thus alternately acts blockingly on the locking element which is supported in the clevis cavity or releases it. A locking device constructed in this manner however calls for a high-precision ratchet mechanism. Moreover, such an indexing transmission cannot be completely accommodated in the castor clevis because of the confined space so that castors constructed in this manner do not have an attractive appearance although this is important for their application as lockable furniture castors or apparatus castors.

Castors and more particularly swivel castors have already been proposed with push-button operation of the locking means in order to avoid these disadvantages and which also provide the castor with a very attractive appearance. The known push-button operating system utilises the alternating pressure mechanism of retractable ball pens and similar writing apparatus as locking element for the locking device of the castor. In such an alternating pressure mechanism the locking element may have a thrust pin which is axially slidable in a guide bush that is disposed on the castor clevis and which can be thrust into its locking position against the pressure exerted by a spring and then locks the locking device in its locked position as described and explained in the German Gebrauchsmusterschrift 1,960,139.

Such an alternating pressure mechanism operates very precisely and reliably but represents a precision mechanism product of peak quality. It can therefore be economicyll applied to castors, which are relatively inexpensive mass-production articles, only if the individual components of the alternating pressure mechanism are manufactured in very large numbers and the castors which are to be provided therewith also have a high degree of manufacturing accuracy. However, in the field of castors, there are embodiments which are of a simpler construction and in which a maximum action of the locking device can be achieved only rarely due to inaccuracies in the entire castor construction and of the type diameter if such a castor is provided with a high-precision alternating pressure mechanism which functions as locking element. Practical operation has shown that the relatively short travel of the push-button control element of the alternating pressure mechanism is not always sufficient in order to compensate for substantial manufacturing and installation tolerances of the castor and its wheel. This defect occurs frequently in the case of larger castors, for example castors for transportation apparatus.

The object of the invention is to avoid these disadvantages and to obtain a lockable castor in which even substantial manufacturing tolerances and inaccuracy of the tyre do not influence the operation of the locking device or only slightly so, there being means for attaching the locking device subsequently to existing castors without having to apply special precision in installation.

The new castor which may more particularly be a swivel castor and whose wheel is supported in a wheel clevis and is provided with locking means for locking the rotation of the wheel and/or the swivel motion of the wheel clevis and is provided with a clamping lever that is pivotably supported in the clevis cavity and may be pivotable and lockable in its locking position by operation of a push-button control element is characterised according to the basic idea of the invention in that the push-button control element is disposed on the clamping lever and a movable locking element is supported on the clamping lever and can be locked in its locking position by the push-button control element. By disposing the push-button control element on the clamping lever, the control travel of the push-button control element is not directly utilised for locking the castor and/or wheel clevis but instead is used for locking an intermediate element, namely a locking element which is also disposed on the clamping lever and is able to bridge substantially longer locking travels than the control travel of the push-button control element.

One advantageous embodiment of the invention is characterised in that the clamping lever is a two-armed rocker which is supported on a traverse shaft and the push-button control element is disposed on one rocker arm. The rocker is appropriately provided with rocker arms of different length and the push-button control element is then disposed on the end of the longer rocker arm thus multiplying the force.

One particularly advantageous embodiment of the invention is characterised in that the locking element which is disposed on the clamping lever is a double-sided pivoting lever which is supported on a pivoting axis on the clamping lever and one of whose lever arms is adapted to be acted upon by the push-button control element. The locking element may preferably comprise a pivotable bell crank. The bell crank may be appropriately provided with an upwardly orientated locking arm which is adapted to plunge into an aperture of the wheel clevis back when the said arm is in the loose position. The loose locking element may be biased by an unlocking spring.

One embodiment of the invention is illustrated in the accompanying drawings which shows a totally lockable swivel castor with mounting flange in diagrammatic form:

Figure 4:
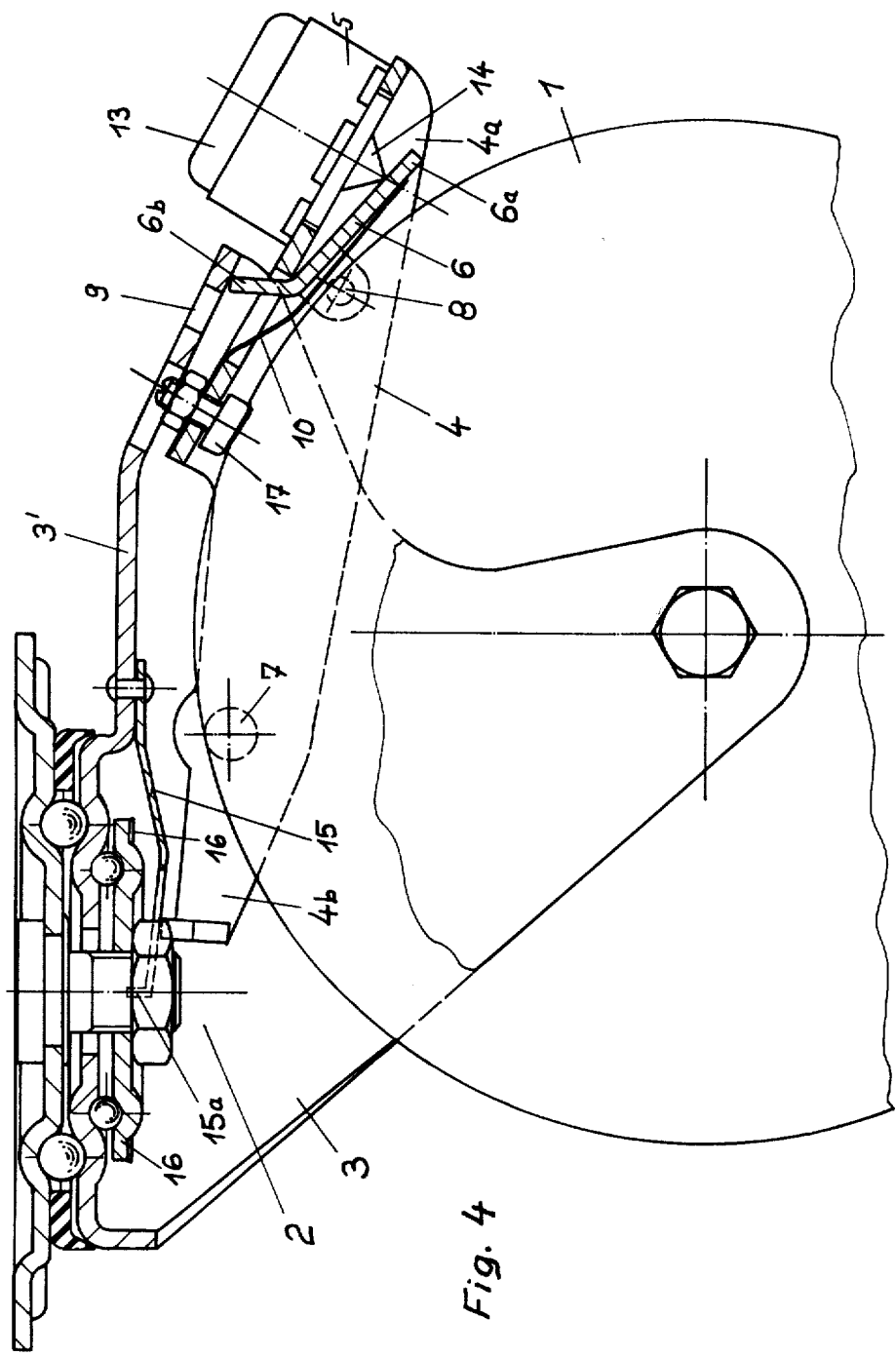
FIG. 4 shows the swivel castor of FIG. 3 in the locked position.
Figure 5:
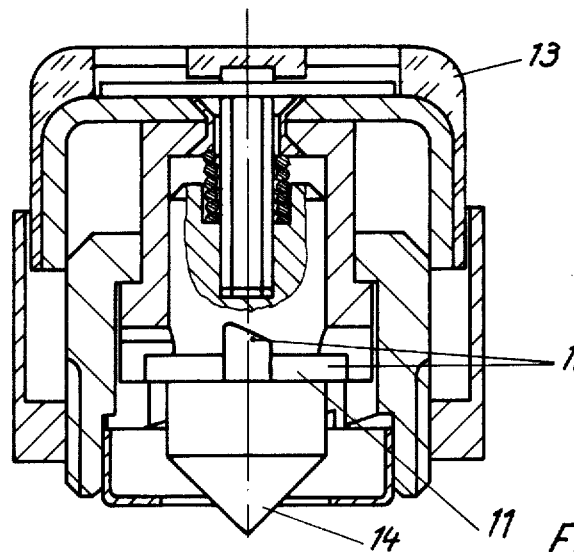
FIG. 5 is a vertical section to an enlarged scale through one embodiment of the push-button control element of FIG. 3 in the unlocked state.
Figure 7:
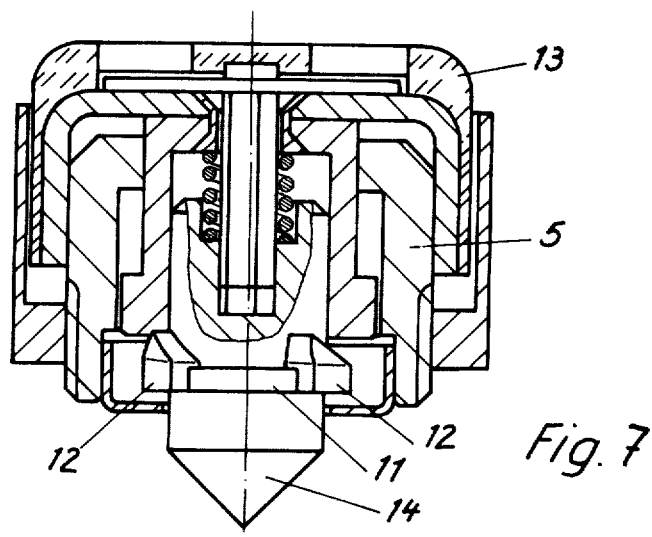

FIG. 7 corresponds to FIG. 5 and shows the push-button control element in the locked state according to FIG. 4.

Figure 6:
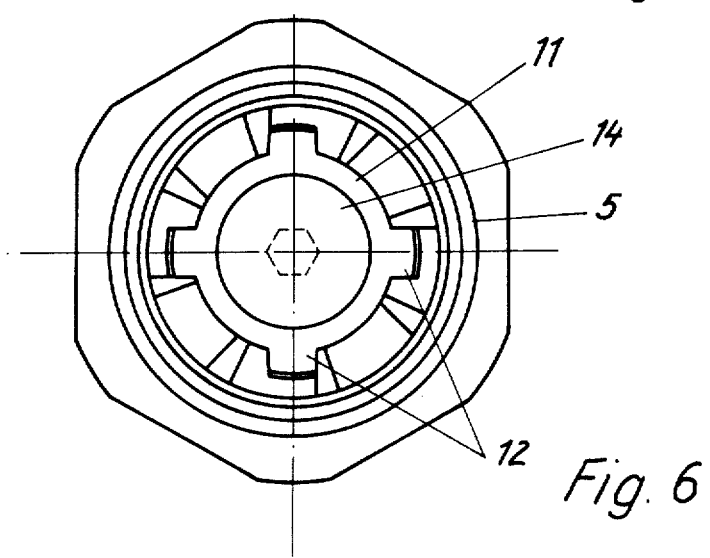
FIG. 6 shows the push-button control element of FIG. 5 from below in the unlocked state.
Figure 8:
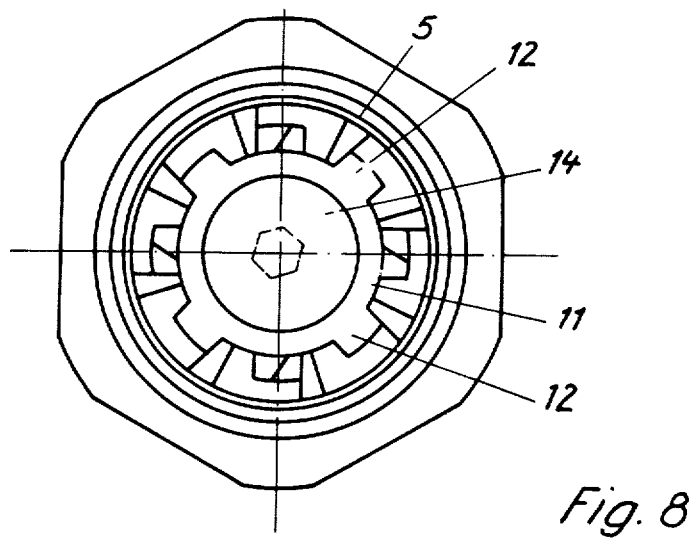

FIG. 8 corresponds to FIG. 6 and shows the push-button control element of FIG. 7 from below in the locked state.

Figure 1:
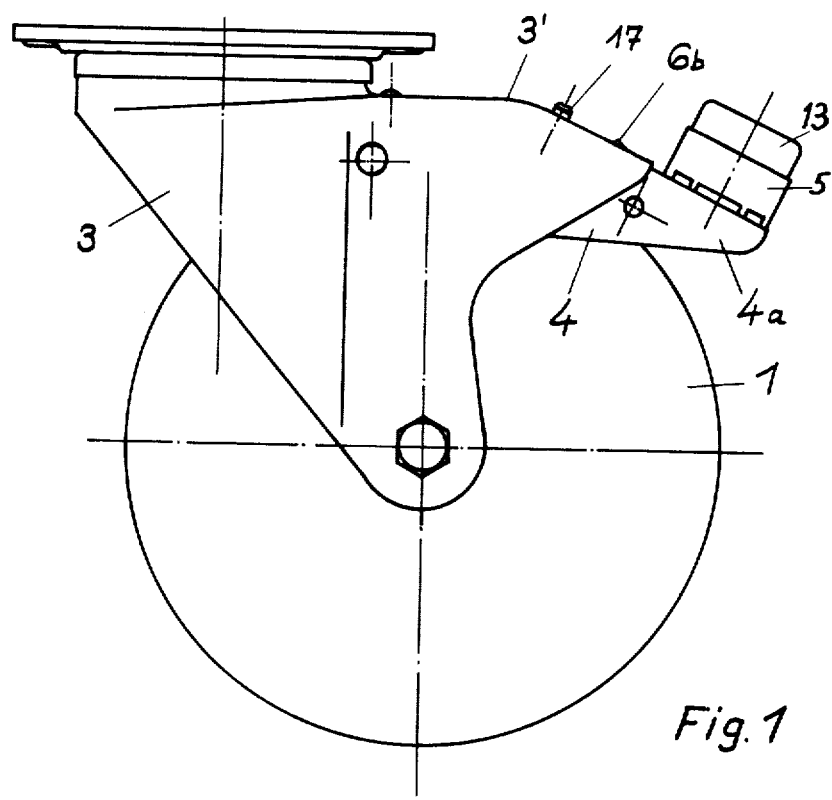
FIG. 1 is a view of the swivel castor.
Figure 2:
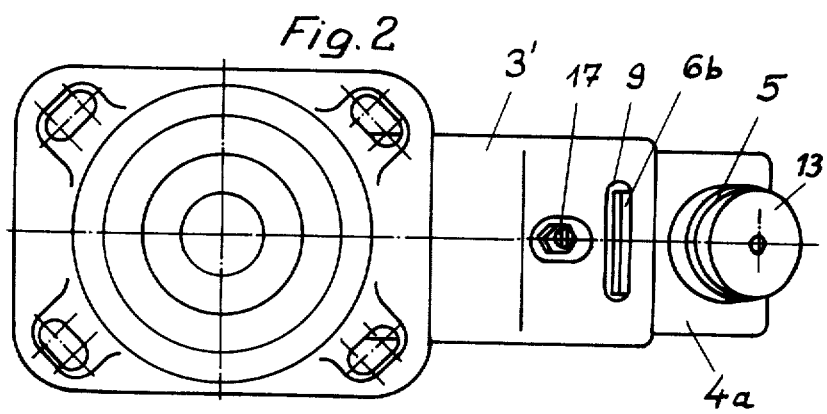
FIG. 2 shows the swivel castor of FIG. 1 as a plan view.
Figure 3:
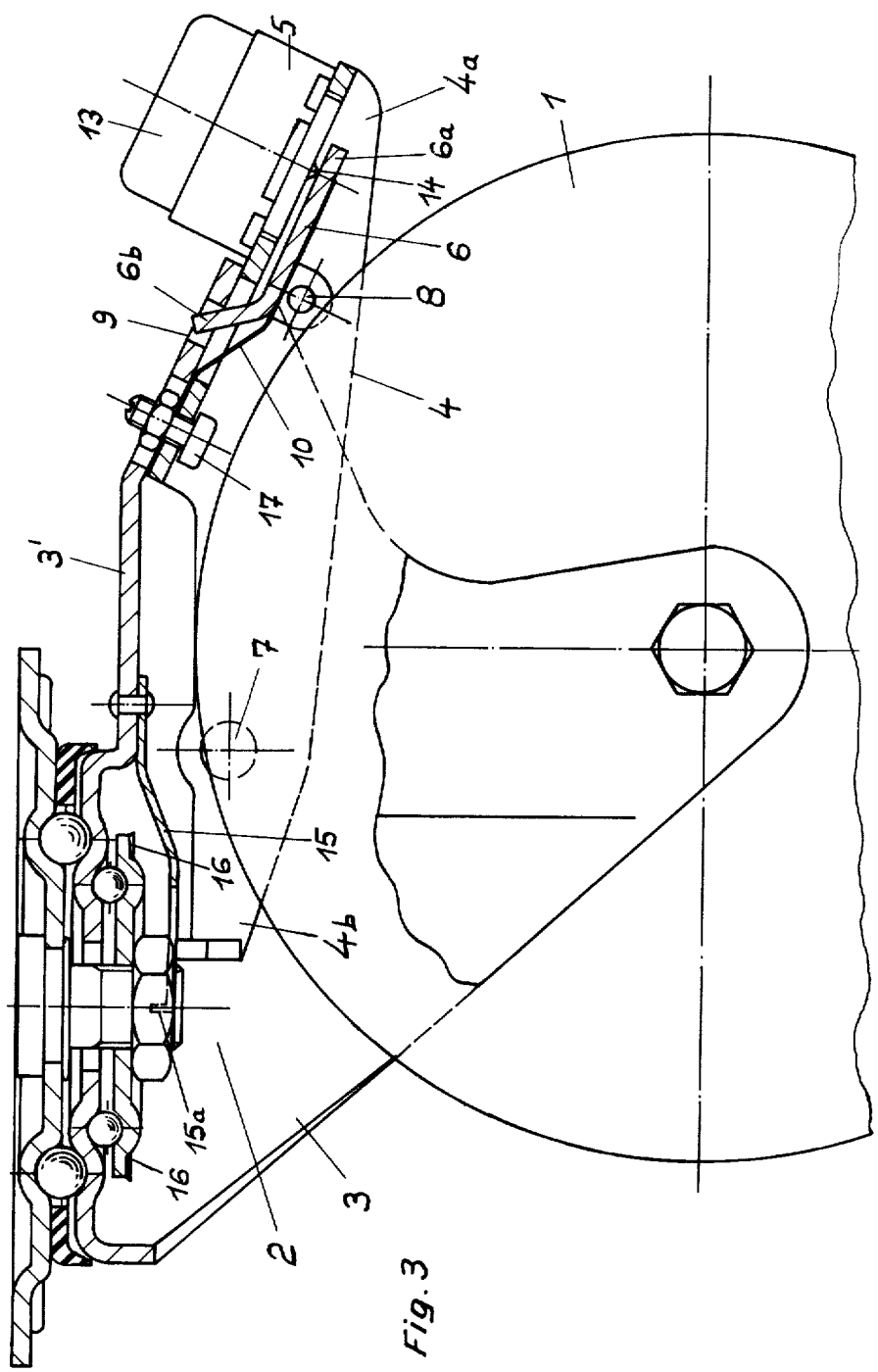
FIG. 3 is a vertical section to an enlarged scale through the swivel castor of FIG. 1 in the loose position.
Figure 9:
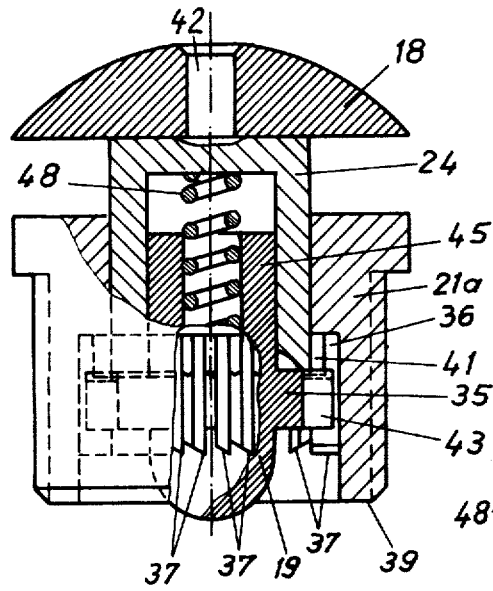

FIG. 9 is a partial vertical section to an enlarged scale through another embodiment of a push-button control element of FIG. 3 in the unlocked state.

Figure 10:
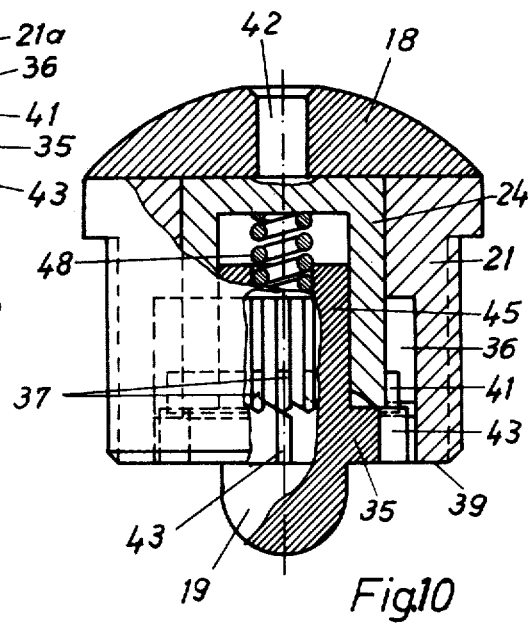

FIG. 10 corresponds to FIG. 9 and shows the push-button control element in an intermediate phase with the push-button depressed.

Figure 11:
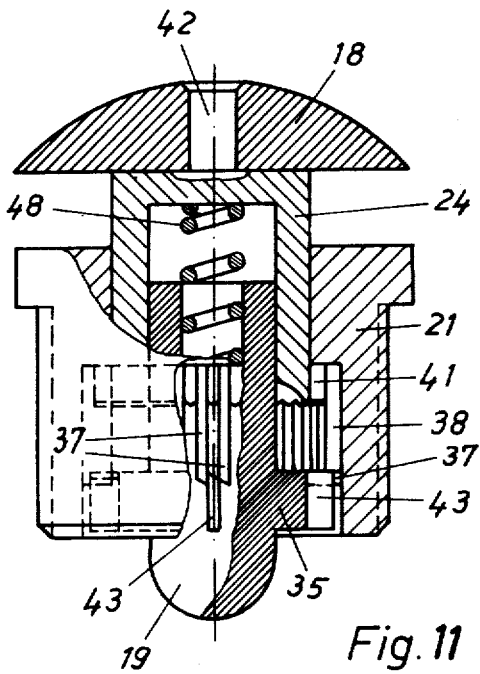

FIG. 11 corresponds to FIG. 9 and shows the push-button control element in the locked state corresponding to FIG. 4.

Figure 12:
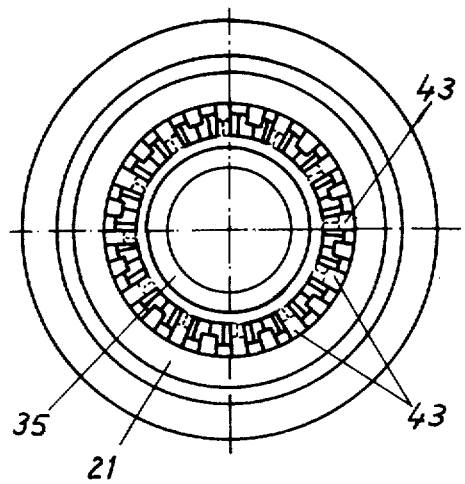

FIG. 12 shows the push-button control element of FIGS. 9 to 11 from below.

FIGS. 13 to 17 show, partially in sectioned form, details of the push-button control element of FIG. 9 while FIG. 18 is a bottom view of FIG. 14, FIG. 19 being the plan view of FIG. 15 and FIG. 20 being the plan view of FIG. 17.

In the illustrated embodiment the swivel castor is provided with locking means for locking the rotation and swivelling motion of the wheel 1 which is disposed within the cavity 2 of the wheel clevis 3 and is provided with a pivotably supported clamping lever 4 (FIGS. 3 and 4). A push-button control element 5 is provided as operating and locking element and is constructed in the form of a mechanical push-button system for a ball pen and is provided with a push-button that can be operated with the toe. By applying foot pressure on the operating knob of the control element 1 the motion of the castor 1 (FIG. 4) is locked and by applying further foot pressure in the same direction the locking action may be again released (FIG. 3) so that the wheel 1 is again freely movable.

The push-button control element 5 is disposed on the clamping lever 4. A movable locking element 6 which can be locked by the push-button control element 5 in its locked position is also supported on the locking lever 4. By disposing the push-button control element 5 on the locking lever 4, the control travel of the push-button control element 5 is not used directly for locking the wheel 1 and/or the wheel clevis 3 but instead is used to lock an intermediate element, namely the movable locking element 6 which is also disposed on the clamping lever 4 and is able to bridge substantially longer locking travels than that provided by the control travel of the push-button control element 5.

The locking lever 4 in this embodiment is a two-armed rocker which is supported on a transverse shaft 7 in the clevis cavity 2. The rocker is provided with rocker arms 4a and 4b of different length. The push-button control element 5 is disposed at the end of the longer rocker arm 4a.

In the illustrated embodiment, the locking element 6 is a double-sided pivoting lever which is supported on a pivoting shaft 8 on the clamping lever 4. The push-button element 5 may act on one lever arm 6a of the pivotable locking element 6. The locking element 6 in this embodiment is a pivotable bell crank which is provided with an upwardly orientated locking arm 6b. In its loose position, the upwardly orientated locking arm 6b is able to plunge into an aperture 9 of the wheel clevis back 3'. The loose, pivotable locking element 6 is biased by an unlocking spring 10 which tends to apply constant thrust to the lever arm 6a that is influenced by the push-button control element 5.

In this embodiment, the push-button control element 5 operates with a toothed rotary disc 11 which in this example is provided with only four indexing teeth 12 (FIGS. 5 to 8). By depressing the push-button 13, the thrust pin 14 of the push-button control element 5 acts on the longer lever arm 6a of the locking element 6 which is constructed as bell crank and can thus be locked by the push-button control element 5 so that in turn it is able to lock the clamping lever 4.

By operating the push-button control element 5 which is disposed on the clamping lever 4 the latter together with its push-button control element 5 is moved so that in the illustrated, totally lockable swivel castor a bifurcated leaf spring 15 with two noses 15a engages with a stationary inner ball socket of the castor back bearing and thus locks the swivel motion of the wheel clevis 3 (FIG. 4). At the same time, the clamping lever 4 thrusts by means of an adjustable brake bolt 17 on the circumference of the wheel 1 whose rotation is thus locked. If the longer lever arm 4a of the clamping lever 4 has been sufficiently deeply depressed in the course of this motion, the upwardly orientated locking arm 6b of the bell crank locking element 6 is able to leave the aperture 9 in the wheel clevis back 3'. During the continued downward motion of the rocker arm 4a the bell crank locking element 6, pivotably supported in the clamping lever 4, is tilted by the thrust bolt 14 of the push-button control element into its locking position in the manner of a tilt lever (FIG. 4). This causes the push-button control element to be indexed into its locked position (FIG. 7) thus locking the bell crank locking element 6. The upwardly orientated locking arm 6b thereof bears upon the wheel clevis back 3' and thus keeps the depressed clamping lever 4 in its locked position.

Repeated action on the push-button 13 of the push-button control element 5 causes the latter to be indexed and thus to be unlocked (FIG. 5). The thrust bolt 14 of the push-button control element 5 therefore again releases the lever arm 6a of the bell crank locking element 6. The unlocking spring 10 then tilts the bell crank locking element 6 back into its starting position in the manner of a tilt lever so that its upwardly orientated locking arm 6b is again able to plunge into the aperture 9 in the wheel clevis back 3'. The clamping lever 4 is thus again unlocked and is then pivoted back by the leaf spring 15 into its starting position so that the wheel 1 is again freely movable and the wheel clevis 3 is again able to swivel freely.

The construction and method of operation of a push-button control element 5 which co-operates with a toothed rotating disc will be described hereinbelow by reference to the embodiment illustrated in FIGS. 9 to 20.

The housing 21 also functions as a fixed sleeve the interior of which is provided with deep spline grooves 36 and twice as many indexing teeth 37 between which are situated spline grooves 38 of lesser depth (FIG. 18). The indexing teeth 37 extend axially and are orientated towards the endface 39 of the fixed sleeve 21 (FIG. 14). In the illustrated embodiment the fixed sleeve 21 is provided with 12 deep spline grooves 36 and 24 indexing teeth 37 as well as 12 spline grooves 38 of lesser depth.

A hollow thrust pin 24 is disposed coaxially in the fixed sleeve 21 and its endface 40 is externally grooved and is also provided with axially orientated indexing teeth 21 the number of which corresponds to the total number of spline grooves 36 and 38 (FIG. 15 and FIG. 19). The indexing teeth 41 of the thrust pin 24 engage in the spline grooves 38 of lesser depth in the fixed sleeve 21 to the full depth thereof and into the spline grooves 36 of greater depth in the fixed sleeve 21 approximately to half the depth thereof (FIGS. 14 and 18). Accordingly, the thrust pin 24 is non-rotatable in the fixed sleeve 21 but is axially movable therein, the said pin being longitudinally slidably guided by means of the spling grooves 36 and 38 of the fixed sleeve 21. The upper end of the hollow thrust pin 24 is provided with an extension 42 to which a push-button 18 is riveted after the thrust pin 24 is inserted into the sleeve 21 (FIG. 9).

The rotary disc 35 with teeth is also disposed coaxially with respect to the fixed sleeve 21 and therefore also coaxially with respect to the hollow thrust pin 24, the circumference of the said disc being deeply grooved and being provided with a tooth system 43 in a ray configuration or crown configuration respectively (FIG. 17). The number of teeth 43 corresponds to the number of the deep spline grooves 36 of the fixed sleeve 21. In the illustrated embodiment the rotating disc 35 with teeth is provided with twelve teeth 43. The teeth 43 extend axially and are constructed as indexing teeth on the upwardly orientated endface 44 of the rotating disc 35 so as to co-operate by engagement with the indexing teeth 41 of the hollow thrust pin 24 as well as with the indexing teeth 37 of the fixed sleeve 21 in such a way that repeated operation and releasing of the push-button 18 and therefore of the thrust pin 24 causes the crown-tooth rotating disc 35 to be indexed by one indexing tooth when it leaves the sleeve grooves 26 and reenters the sleeve grooves 36 so that the reverse motion of the axially movable rotating disc 35 is alternately locked or released in the course of the aforementioned successive rotating motion and its intermediate position. The crown-tooth rotating disc 35 is provided with an upper hollow extension 45 which is adapted to plunge into the cavity 46 of the thrust pin 24, the cavity 47, provided in the extension 45, being adapted to receive a compression spring 48 (FIG. 9).

At the bottom, the rotating disc 35 with teeth is provided with a thrust pin 19. The compression spring 48 tends to thrust the hollow thrust pin 24 with its upper push-button 18 constantly in the upward direction. If the rotating disc with teeth 35 assumes a position in which its teeth 43 correspond to the deep spline grooves 36 of the fixed sleeve 21, the rotating disc 35 with teeth is able to plunge into the spline grooving of the fixed sleeve 21 and is axially guided thereby (FIG. 9).

The method of operation of the push-button control element which co-operates with the rotating disc 35 with teeth is as follows:

If the locking device and the ball pen push-button mechanism, which functions as operating and locking element, were in its loose position (FIG. 9) and if the push-button 18 were then operated with the toe so that the hollow thrust pin 24 is depressed (FIG. 10) the indexing teeth 41 of the hollow thrust pin 24 will push the indexing teeth 43 of the rotating disc 35 out of the deeper spline grooves 36 of the fixed sleeve 21 in the downward direction. As soon as the indexing teeth 43 of the rotating disc 35 have left the deeper spline grooves 36 of the fixed sleeve 21, they will slide along the endfaces of the indexing teeth 37 due to a lateral force component so that the rotating disc 35 with teeth is rotated. The grooves 38 of the fixed sleeve 21 which are thus reached have a lower depth than the grooves 36 which have just been left so that the indexing teeth 43 of the rotating disc 35 do not plunge into the grooves 38. The reverse motion of the axially movable rotating disc 35 therefore remains blocked while the compression spring 48 merely thrusts the hollow thrust pin 24 with its push-button 18 upwardly into its initial position (FIG. 11). Owing to the reverse motion of the axially movable rotating disc 35 being locked, the locking pressure exerted by the thrust pin 19 is maintained so that the swivelling motion of the castor as well as the rotating motion of its wheel 1 remain locked.

If the push-button 18 is then again operated and the hollow thrust pin 24 is again depressed, the indexing teeth 41 of the hollow thrust pin 24 will again meet the indexing teeth 43 of the locked rotating disc 35 at the end of their downward motion and push the said teeth in front of themselves (FIG. 10) so that they are able to slide upon each other due to the lateral force component so that the rotating disc 35 with teeth is rotated. The indexing teeth 43 of the rotating disc 35 slide over the succeeding indexing teeth 37 of the fixed sleeve 21 and reach the next deeper spline grooves 36 of the fixed sleeve 21 into which they are able to plunge in the course of the return motion of the hollow thrust pin 24 and its indexing teeth 41. The return motion of the axially movable rotating disc 35 is thus again released so that the castor is again unlocked with respect to its swivelling ability as well as with respect to the rotation of its wheel 1.

I claim:

1. A castor, in particular a swivel castor, comprising a wheel which is supported in a wheel clevis and locking means for locking the rotation of the wheel and/or the swivel motion of the wheel clevis including a clamping lever that is pivotably supported in the clevis cavity and is pivotable and lockable in its locking position by operation of a push-button control element, characterised in that the push-button control element is attached or fastened on the pivotable clamping lever as a part thereof and so that the push-button control element forms a pivotable unit with the clamping lever, and a movable lever locking element which also is attached or fastened on the pivotable clamping lever and which can be locked itself in its locking position by said push-button control element after locking said pivotable clamping lever.

2. A castor according to claim 1, in particular of the kind of a swivel castor, comprising a wheel which is supported in a wheel clevis and locking means for locking the rotation of the wheel and/or the swivel motion of the wheel clevis including a clamping lever that is pivotably supported in the clevis cavity and may be pivotable and lockable in its locking position by operation of a push-button control element, characterised in that the pivotable clamping lever is a two-armed rocker which is pivotably supported on a transverse shaft and that the push-button control element is attached or fastened on one rocker arm of the pivotable clamping lever as a part of said rocker arm forming a pivotable unit therewith, and a movable lever locking element which also is attached or fastened on the pivotable clamping lever and which can be locked itself in its locking position by said push-button control element after locking said pivotable clamping lever.

3. Castor according to claim 2, characterised in that the rocker is provided with rocker arms of differend length and the push-button control element is attached or fastened near the end of the longer rocker arm.

4. Castor according to claim 1, characterised in that the lever locking element is a double-sided pivoting lever which is supported on the clamping lever.

5. A castor according to claim 1, in particular of the kind of a swivel castor, comprising a wheel which is supported in a wheel clevis and locking means for locking the rotation of the wheel and/or the swivel motion of the wheel clevis including a clamping lever that is pivotably supported in the clevis cavity and may be pivotable and lockable in its locking position by operation of a push-button control element, characterised in that the pivotable clamping lever is a two-armed rocker which is pivotably supported on a transverse shaft and having rocker arms of different length, and that the push-button control element is attached or fastened on the longer rocker arm near its end as a part of said rocker arm and forming a pivotable unit therewith and that the lever locking element is a double-sided pivoting lever which is supported on the longer rocker arm of said pivotable clamping lever by means of a pivoting shaft, and that one of the lever arms of said pivoting lever is adapted for being acted upon by said push-button control element to be locked in its locking position by said push-button control element after locking said pivotable clamping lever.

6. Castor according to claim 4, characterised in that the lever locking element is a pivotable bell crank.

7. Castor according to claim 6, characterised in that the bell crank is provided with an upwardly orientated locking arm which is adapted to plunge into an aperture of the wheel clevis back when it is in the loose position.

8. Castor according claim 1, characterised in that the movable locking element is biased by an unlocking spring.

* * * * *